Aug. 14, 1934.   T. WARDLEY   1,970,113
FOREHEARTH FOR GLASS MELTING FURNACES AND
METHOD OF CONDITIONING MOLTEN GLASS
Filed April 26, 1929   3 Sheets-Sheet 3
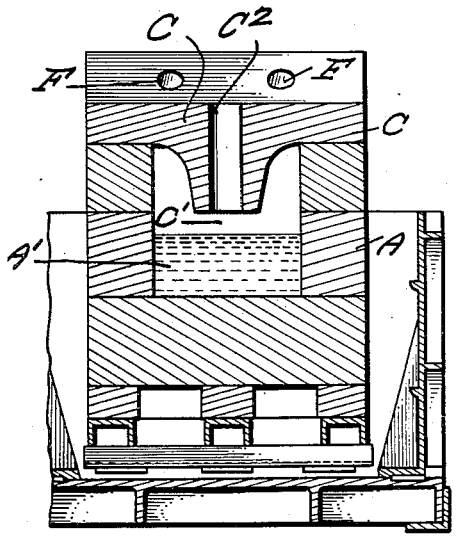
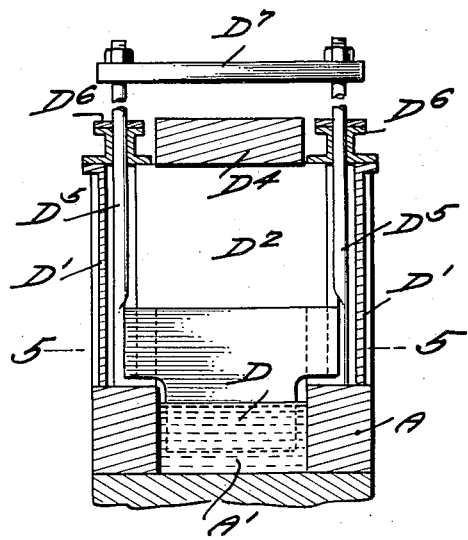
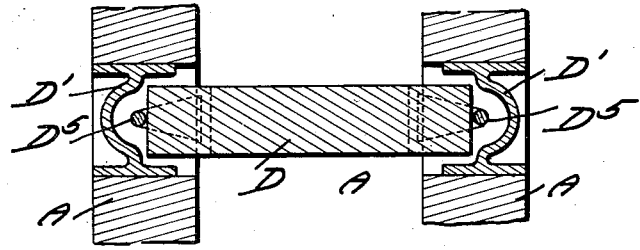
INVENTOR.
Thomas Wardley
BY
ATTORNEYS.

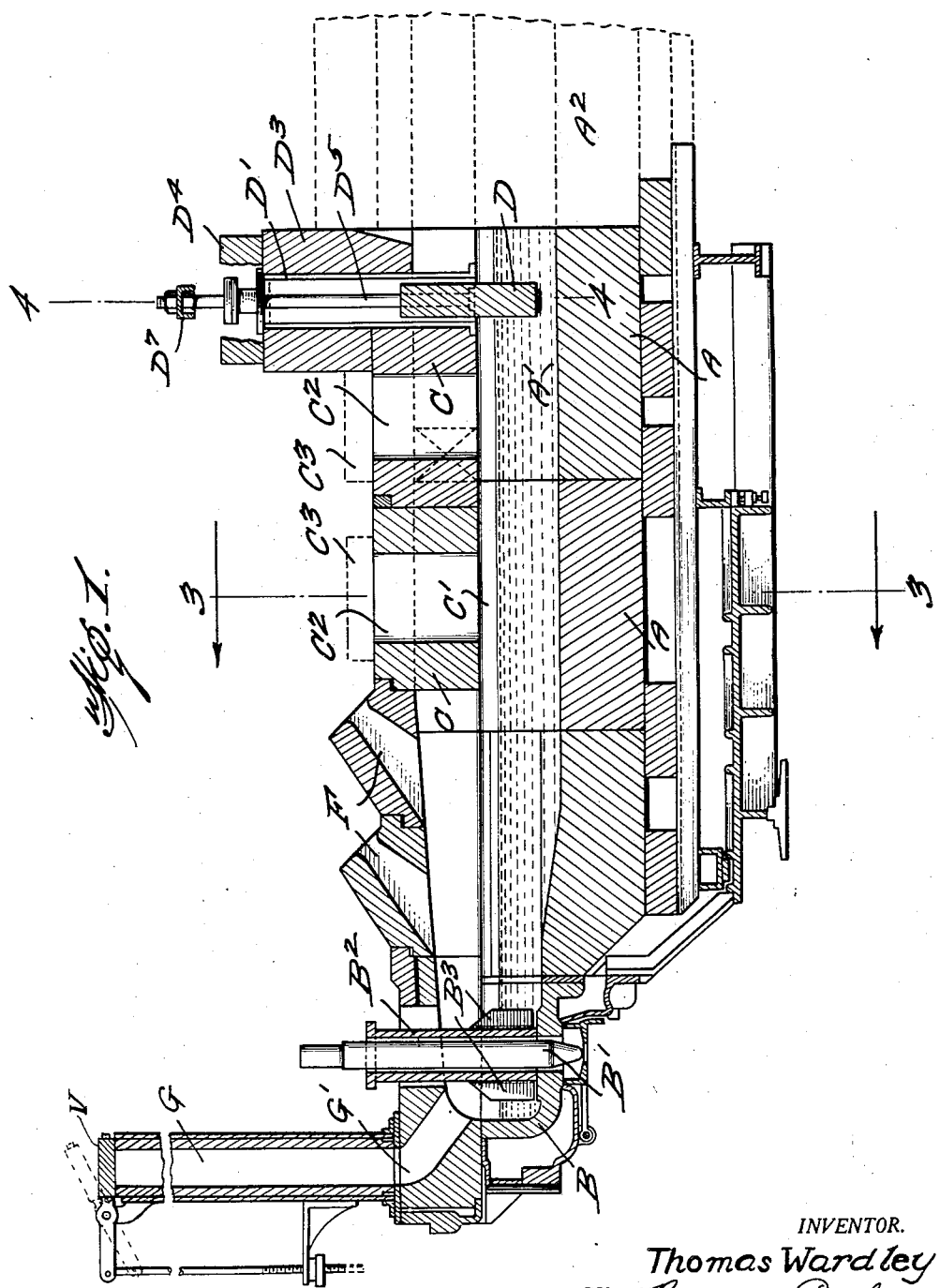

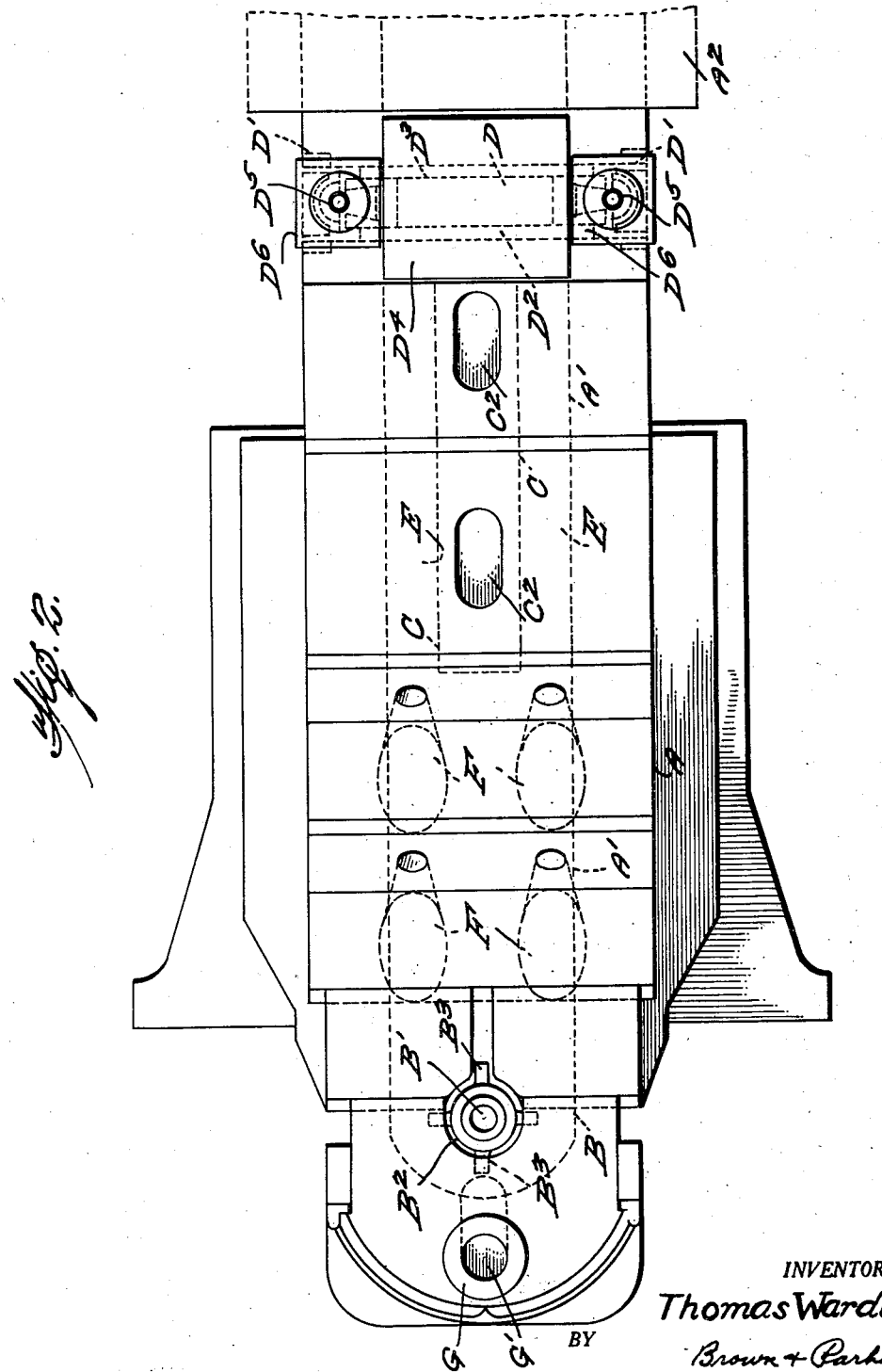

Patented Aug. 14, 1934

1,970,113

UNITED STATES PATENT OFFICE 1,970,113

FOREHEARTH FOR GLASS MELTING FURNACES AND METHOD OF CONDITIONING MOLTEN GLASS

Thomas Wardley, Greenford, England, assignor to Hartford-Empire Company, Hartford, Conn., a corporation of Delaware Application April 26, 1929, Serial No. 358,291
In Great Britain May 8, 1928

5 Claims. (Cl. 49—55)

This invention relates to forehearths of glass melting furnaces. It is found that the molten glass which passes through the forehearth from the furnace to the discharge bowl or spout tends to become colder adjacent to the side walls than at the middle part of the forehearth, so that the glass at the sides becomes stagnant and comparatively viscous to an extent that may cause devitrification whilst only the glass at the middle part of the forehearth is sufficiently fluent and in proper condition to flow to the discharge bowl or spout. One of the objects of the present invention is to provide improvements whereby the temperature conditions can be so controlled as to ensure that the molten glass in the forehearth is maintained at a uniform temperature and in a state of uniform fluidity.

According to this invention the forehearth is provided with means which permit of distribution of heat or heating medium in such manner that a temperature environment is established which ensures that the glass at the sides is maintained in the same or approximately the same fluent state as that at the middle part of the forehearth. The said means may also be such as to enable the temperature at the middle and hottest part of the glass in the forehearth to be reduced with a view to maintaining the glass uniform as regards temperature and fluidity. The forehearth may be provided with a member that extends along the middle part thereof above the level of the molten glass so that spaces or passages for the heating medium are formed between the sides of the said member and the side walls of the forehearth, which passages are substantially larger than the comparatively restricted space between the level of the glass in the forehearth and the lower surface of the said member. The said member may be provided with cooling openings or ports through which the heat may be radiated from the middle part of the molten glass below the said member and any suitable means may be provided for controlling or regulating the radiation of the heat. By this construction the cooling of the middle part of the molten glass in the forehearth can be effected without cooling the glass at the sides and without introducing cooling medium into the forehearth.

The heating medium used within the forehearth may be hot gases supplied from burners in the forehearth, but under certain conditions hot gases from the furnace may be allowed to pass into the forehearth. The burners for supplying the hot gases into the forehearth may be located between the forward end of the aforesaid member and the discharge bowl or spout, preferably in the roof of the forehearth. A chimney or stack may be located beyond the forehearth in proximity to the aforesaid discharge bowl or spout so that the gases from the burners can travel along the upper surface of the molten glass in the forward part of the forehearth and in the discharge bowl to ensure that the glass in and entering the latter is at the required temperature. By means of a damper or the like associated with the aforesaid chimney or stack, the flow of gases can be regulated and when desired this controlling member may be closed and the ports or openings in the said member opened to enable the flow of gases to be reversed and thus pass towards the furnace along the aforesaid side passages in order to equalize the temperature of the molten glass. When hot gases are allowed to pass from the furnace they travel along the said side passages and through the restricted space below the said member whence they may escape through the aforesaid chimney or stack.

According to this invention the skimmer block which is provided between the furnace and the forehearth is so mounted as to be readily adjustable in a closed chamber that prevents escape of hot gases without the necessity of packing around the upper part of the skimmer block. The skimmer block which is made of refractory material is mounted in guides of suitable metal that prevent fusing of the skimmer block to the refractory material forming the sides of the forehearth, and these guides may form part of the closed chamber in which the skimmer block is vertically adjustable.

In order that the said invention may be clearly understood and readily carried into effect, the same will now be described more fully with reference to the accompanying drawings, in which:—

Figures 1 and 2 are respectively a sectional elevation and a plan of a forehearth embodying the improvements according to this invention.

Figure 3 is a transverse sectional view taken on the line 3—3 of Figure 1.

Figure 4 is a transverse sectional view taken on the line 4—4 of Figure 1.

Figure 5 is a sectional plan view taken on the line 5—5 of Figure 4.

A represents the forehearth having a channel or passage A' through which the molten glass passes from the furnace A² to the discharge bowl or spout which in the example shown contains a controlling plunger B' that is surrounded by a sleeve or tube B² provided with propelling projections B³ as described in the specification of British Patent No. 280611. The upper part or roof of the forehearth is provided with a depending member or projection C which extends from a position at the rear of the forehearth adjacent to the skimmer block D, to near the forward part so as to provide a restricted space C' above the level of the molten glass and also side passages E along the whole length of the said member adjacent to the side walls, these passages E being substantially larger than the space or passage C'. The member C is provided with openings or ports $C^2$ that extend from the lower part to the upper part so as to establish communication between the restricted space C' and the outside air, and these openings may be controlled by plates or closing devices $C^3$, indicated by dotted lines in Figure 1. In the example shown a series of openings F are provided in the upper part of the forehearth as shown in Figures 1 and 2 to receive burners, and the arrangement may be such that a pair of burners may be placed in any two of the said openings, which latter are inclined or directed towards the discharge bowl or spout B as shown in Figure 1. At a position beyond the discharge bowl or spout B that forms a continuation of the forehearth, a chimney or stack G is provided for the egress of the hot gases through a passage G' leading from the upper part of the discharge bowl. By means of a damper or the like, V, that may be located in the aforesaid stack or chimney, the flow of hot gases from the burners can be regulated and by closing the said damper and opening the ports $C^2$ in the member C reversal of the flow of gases may be effected so that the gases can pass towards the furnace along the passages E, E and the restricted space C' so as to equalize the temperature of the molten glass. The gases escape by passing through the aforesaid ports $C^2$ in the member C at which time the furnace is closed or shut off from the forehearth by the skimmer block D except for the passage through which the molten glass passes from the furnace into the forehearth, which passage may be varied by adjustment of the skimmer block. Normally the skimmer block D is maintained in this position but under some conditions the skimmer block may be raised above the level of the molten glass in order to allow the hot gases to pass from the furnace and to be drawn from the forehearth and this is particularly useful during shutting down periods, as by allowing the gases from the furnace to pass through the forehearth, the glass in the latter is prevented from becoming too cold so that economy in fuel can be effected when re-starting. The skimmer block D may however be raised to provide a through passage for the gases from the furnace at other times, especially if the furnace conditions are uniformly maintained. The hot gases in flowing from the furnace when the skimmer block is raised, pass along the passages E at the sides of the member D and also in the restricted space C' under the said member C, so as to escape through the forwardly disposed stack or outlet G and under these conditions the distribution of the heat is such that the glass adjacent to the side walls of the forehearth is maintained at a temperature approximating that of the middle part of the glass. Normally, that is, when the skimmer block is lowered to project into the glass, there may be a slight flow of hot gases from the furnace thorugh spaces between the skimmer block and the side walls of the forehearth, but this flow is practically negligible and in any case it is at a position where the heat is required as the said spaces are in alignment with the heating passages E at the sides of the forehearth. The forehearth channel in which the molten glass is contained is made shallow and narrow and the side walls of the forehearth are flush with the sides of the discharge bowl or are otherwise arranged so that there are no lateral obstructions which would impede the flow or travel of the glass at any point across the forehearth channel into the discharge bowl. The skimmer block D which may be made of refractory material is slidably mounted in vertical guides D' mounted in the sides of the forehearth, the said guides being made of nickel chromium alloy that prevents fusing of the skimmer block to the refractory material forming the sides of the forehearth. The said guides D' extending upwardly beyond the sides of the forehearth and by means of front and rear members $D^2$ and $D^3$ in conjunction with a transverse upper portion $D^4$, a sealed or closed chamber is provided in which the skimmer block can be vertically moved in the aforesaid guides. The said skimmer block D is supported so as to be vertically movable in the said guides D' by means of rods $D^5$ made of nickel chromium alloy having hook like lower ends that extend under lateral projections on the skimmer block, the upper ends of the rods $D^5$ passing through glands $D^6$ or the like at the upper ends of the said guides D' and being connected to a transverse bar $D^7$ to which a cable or the like that passes over a pulley may be attached so as to provide means whereby the skimmer block can be readily adjusted to the required position. The readily adjustable skimmer block can be used in connection with the control of the temperature of the glass in the forehearth as by altering the depth or extent to which it projects into the molten glass, the temperature of the latter can be varied.

It is to be understood that the features of the invention may be modified as to combination, construction and arrangement, to meet the requirements of particular service conditions and uses without departing from the spirit and scope of the invention, as set out in the appended claims.

I claim:

1. The combination with a glass melting furnace of a forehearth projecting therefrom, said forehearth having an enclosed channel communicating at one end with the furnace below the glass level in the latter and having glass feeding means adjacent to its other end, said channel having a space for heated gases above the glass therein and having a controllable outlet for gases adjacent to said feeding means, a refractory member depending from the top of said channel nearly to the glass in the latter and extending longitudinally of the channel for part of the length of the latter, said refractory member having longitudinaly spaced vertical openings formed therein, each of said openings being independently controllable, and means whereby a heating medium can be introduced into the space above the channel between the said depending refractory member and the space above said feeding means.

2. The combination with a glass melting furnace of a forehearth projecting therefrom and having a channel for the flow of glass from the furnace, a vertically adjustable refractory skimmer block or gate extending transversely of the channel adjacent to the juncture of the forehearth with the furnace, means providing a vertical chamber in which said skimmer block may be adjusted vertically, said chamber being in open communication at its lower end with the space above the glass in the channel and being continuously sealed off from the atmosphere at all places above its lower end, and means for guiding said skimmer block when it is adjusted vertically, said guide means being formed of a metal adapted to prevent fusing of the skimmer block to the adjacent walls of the forehearth.

3. The method of controlling the temperature and condition of glass flowing along a passage from a melting furnace to a glass delivery outlet, said method comprising disposing a refractory baffle member above the middle portion of the glass in the passage in spaced relation to the side walls of the passage to produce a space of restricted area above the middle portion of the glass in the passage and spaces of greater area above the side portions of the glass in said passage, regulably controlling the radiation of heat from the middle portion of the glass in said passage through vertical openings in said depending baffle member, introducing a heating medium into the space above the glass at a place in advance of said passages, and selectively controlling the movement of said heating medium and the gases heated thereby along the glass in said space to cause them to move longitudinally of said space close to the glass and in forward and rearward directions at different times when different temperature conditions exist in the glass flow passage.

4. The combination with a glass melting furnace of a forehearth projecting therefrom, said forehearth comprising a glass conducting channel having a bottom discharge outlet adjacent to its outer end, a cover structure cooperating with said channel to enclose the space above the glass in said channel substantially from the juncture of said channel with said furnace to a place beyond said bottom discharge outlet, means separating the enclosed space above the glass in the forehearth channel from the space above the glass in the furnace, a member depending from said cover structure and extending longitudinally of the forehearth channel in spaced relation with the side walls of the channel to provide side passages for the flow of heated gases above the side portions of the stream of glass in the channel and a restricted middle passage above the middle portion of the glass stream in said channel, said depending member terminating at its outer end at a substantial distance from the outer end of said channel and rearwardly of said discharge outlet said cover structure having a vertical opening formed through said depending member, means for regulably controlling said vertical opening, a stack communicating with the outer end of the space above the glass in the channel in advance of said outlet, said stack having a damper for controlling draft therethrough, said cover structure having a burner opening located between the outer end of said depending member and the space above the glass at said outlet, said burner opening being adapted to permit flames from a burner to be projected therethrough into the space above said glass in advance of said passages and rearwardly of said stack.

5. The combination with a glass melting furnace of a forehearth projecting therefrom, said forehearth having a glass conducting channel for receiving glass from said furnace, a feed spout at the outer end of said channel, said feed spout having a discharge outlet in its bottom, a cover structure cooperating with said feed spout and with the wall of said channel to enclose the space above the glass in said channel and said feed spout, means for projecting a heating medium into said space at a place intermediate its length, and draft controlling means communicating with said space at places which respectively are located in advance and at the rear of the place of introduction of said heating medium thereinto, said draft inducing means being adjustable in cooperation with each other to cause selectively a flow of said heating medium and the gases heated thereby close to the glass and longitudinally of said space in either of opposite directions in said forehearth.

THOMAS WARDLEY.